(12) United States Patent
Roberts et al.

(10) Patent No.: US 10,754,234 B2
(45) Date of Patent: Aug. 25, 2020

(54) PROJECTION DEVICE

(71) Applicant: Sharp Kabushiki Kaisha, Osaka (JP)

(72) Inventors: Peter John Roberts, Oxford (GB); Noriaki Fujii, Osaka (JP); Kengo Yamasawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 16/203,800

(22) Filed: Nov. 29, 2018

(65) Prior Publication Data

US 2020/0174356 A1 Jun. 4, 2020

(51) Int. Cl.
| | |
|---|---|
| *G03B 21/12* | (2006.01) |
| *G03B 21/20* | (2006.01) |
| *G02B 26/12* | (2006.01) |
| *G02B 26/08* | (2006.01) |
| *G02B 27/14* | (2006.01) |
| *G03B 21/14* | (2006.01) |

(52) U.S. Cl.
CPC ..... *G03B 21/2033* (2013.01); *G02B 26/0833* (2013.01); *G02B 26/128* (2013.01); *G02B 27/141* (2013.01); *G03B 21/142* (2013.01); *G03B 21/2066* (2013.01)

(58) Field of Classification Search
CPC .............. G03B 21/2033; G03B 21/142; G03B 21/2066; G02B 26/0833; G02B 26/128; G02B 27/141

USPC .......................................................... 353/85
See application file for complete search history.

(56) References Cited

U.S. PATENT DOCUMENTS 9,247,221 B2  1/2016 Kusaka et al.
2019/0317387 A1* 10/2019 Hanzawa ............. G03B 21/142

FOREIGN PATENT DOCUMENTS

JP  5320932  4/2010

* cited by examiner

*Primary Examiner* — Jerry L Brooks
(74) *Attorney, Agent, or Firm* — Renner, Otto, Boisselle & Sklar, LLP

(57) ABSTRACT

An embodiment of the present invention enables an improvement in image resolution. A projection device (1) includes: a light source (11); a MEMS mirror (14) which reflects and two-dimensionally scans the laser beam emitted from the light source; and a free-form lens (15) which changes focusing properties of the laser beam reflected by the scanning section such that, after propagation of the laser beam to a screen (20) onto which the image is to be projected, a shape of the laser beam when viewed on the screen has a first width that is shorter than a second width of the shape, the first width being along a horizontal direction corresponding to a primary scanning direction in which the MEMS mirror scans the laser beam, the second width being along a vertical direction.

9 Claims, 13 Drawing Sheets

14: MEMS MIRROR
L1: INCIDENT LIGHT
L2: REFLECTED LIGHT
FAD: FAST-AXIS SCAN DIRECTION
SAD: SLOW-AXIS SCAN DIRECTION

Instantaneous projected spot profile

PROJECTION DEVICE

TECHNICAL FIELD

The present invention relates to a projection device.

BACKGROUND ART

A projection device which two-dimensionally scans a laser beam so as to project an image on a projection surface (screen) is disclosed in, for example, Patent Literatures 1 and 2.

Patent Literature 1 discloses a projection device including: a collimator lens collimating a laser beam emitted from a light source; a beam contracting/shaping element that reduces a luminous beam width in a predetermined direction of the laser beam emitted from the collimator lens; a condensing lens that converts the laser beam into focused light; and a two-dimensional scanning unit configured to two-dimensionally scan and project the laser beam emitted from the condensing lens.

Patent Literature 2 discloses a projection device including: a plurality of light sources; and a lens which causes at least one target light beam to have a point image on a projection surface such that a width of the point image in the slow-axis scan direction is greater than the width of the point image in the fast-axis scan direction. The at least one target light beam is selected from among a plurality of beams constituting combined light, the combined light being obtained by combining light emitted from the plurality of light sources.

CITATION LIST

Patent Literature

[Patent Literature 1]
U.S. Pat. No. 9,247,221 B2
[Patent Literature 2]
Japanese Patent No. 5320932

SUMMARY OF INVENTION

Technical Problem

An object of an aspect of the present invention is to provide a projection device which is capable of improving image resolution in a manner differing from the techniques of Patent Literatures 1 and 2.

Solution to Problem

In order to solve the above problem, a projection device in accordance with an aspect of the present invention is a projection device which scans a laser beam so as to project an image, the projection device including: a light source which emits the laser beam; a scanning section which reflects and two-dimensionally scans the laser beam emitted from the light source; and a shape altering section which changes focusing properties of the laser beam reflected by the scanning section such that, after propagation of the laser beam to a projection surface onto which the image is to be projected, a shape of the laser beam when viewed on the projection surface has a first width that is shorter than a second width of the shape, the first width being along a first direction corresponding to a primary scanning direction in which the scanning section scans the laser beam, the second width being along a second direction orthogonal to the first direction.

In order to solve the above problem, a projection device in accordance with another embodiment of the present invention is a projection device which scans a laser beam so as to project an image, the projection device including: a light source which emits the laser beam; a scanning section which reflects and two-dimensionally scans the laser beam emitted from the light source; and a shape altering section which changes a shape and a size of the laser beam reflected by the scanning section as viewed after the laser beam has propagated from the shape altering section to a projection surface upon which the projected image is to be viewed, the size of the laser beam being greater at the shape altering section than at the scanning section, the shape altering section being configured to decrease an angle of divergence of the laser beam in a first direction corresponding to a primary scanning direction in which the scanning section scans the laser beam.

Advantageous Effects of Invention

A projection device in accordance with an aspect of the present invention makes it possible to improve image resolution.

shape of area illuminated by laser beam during scanning equivalent to 1 pixel, and (iv) energy density distribution during scanning equivalent to 1 pixel.

Figure 10:
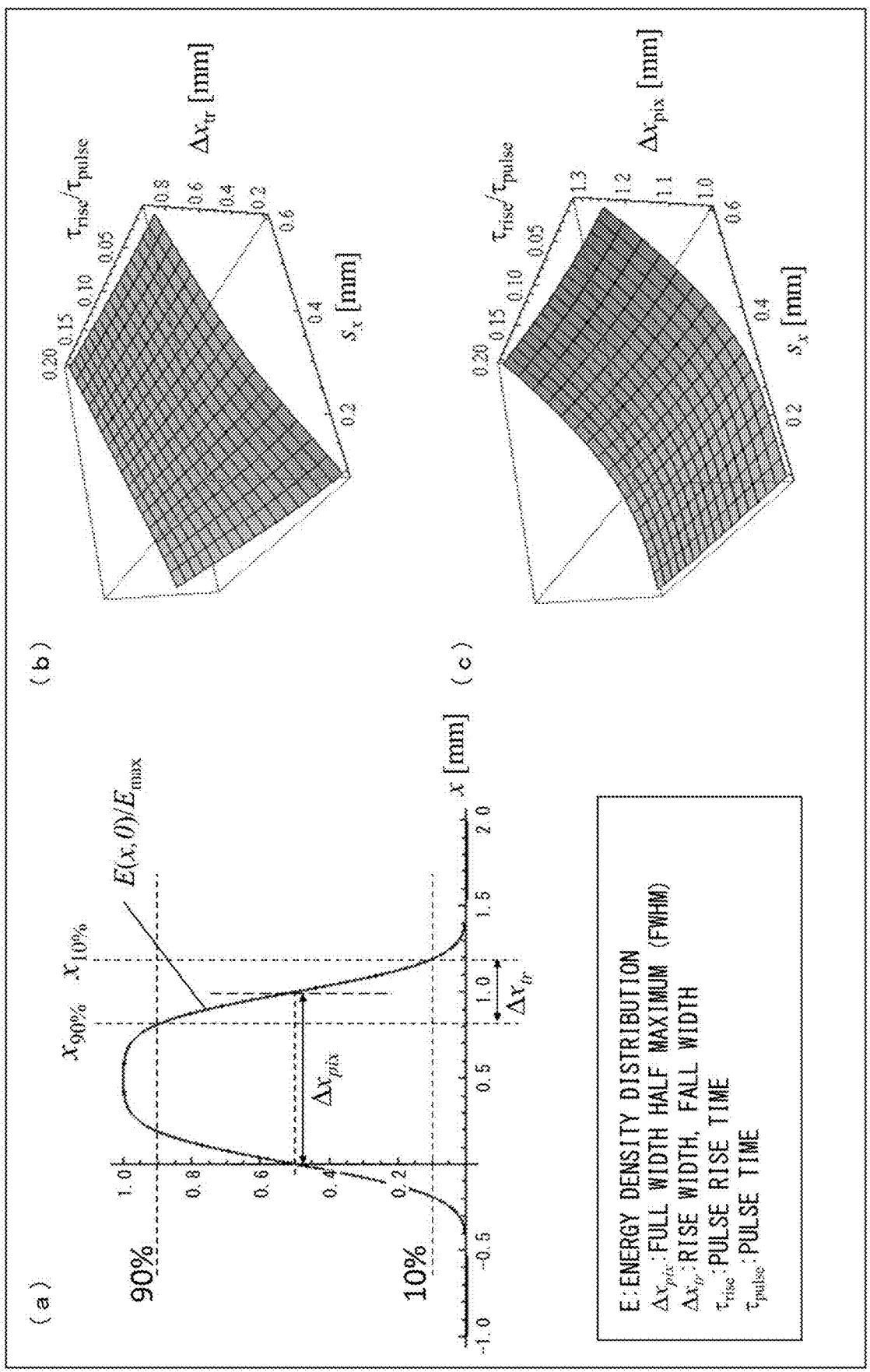

Each of (a) through (c) of FIG. 10 is a diagram for explaining a correlation between pulse rise time, horizontal direction beam radius, and image resolution.

Figure 11:
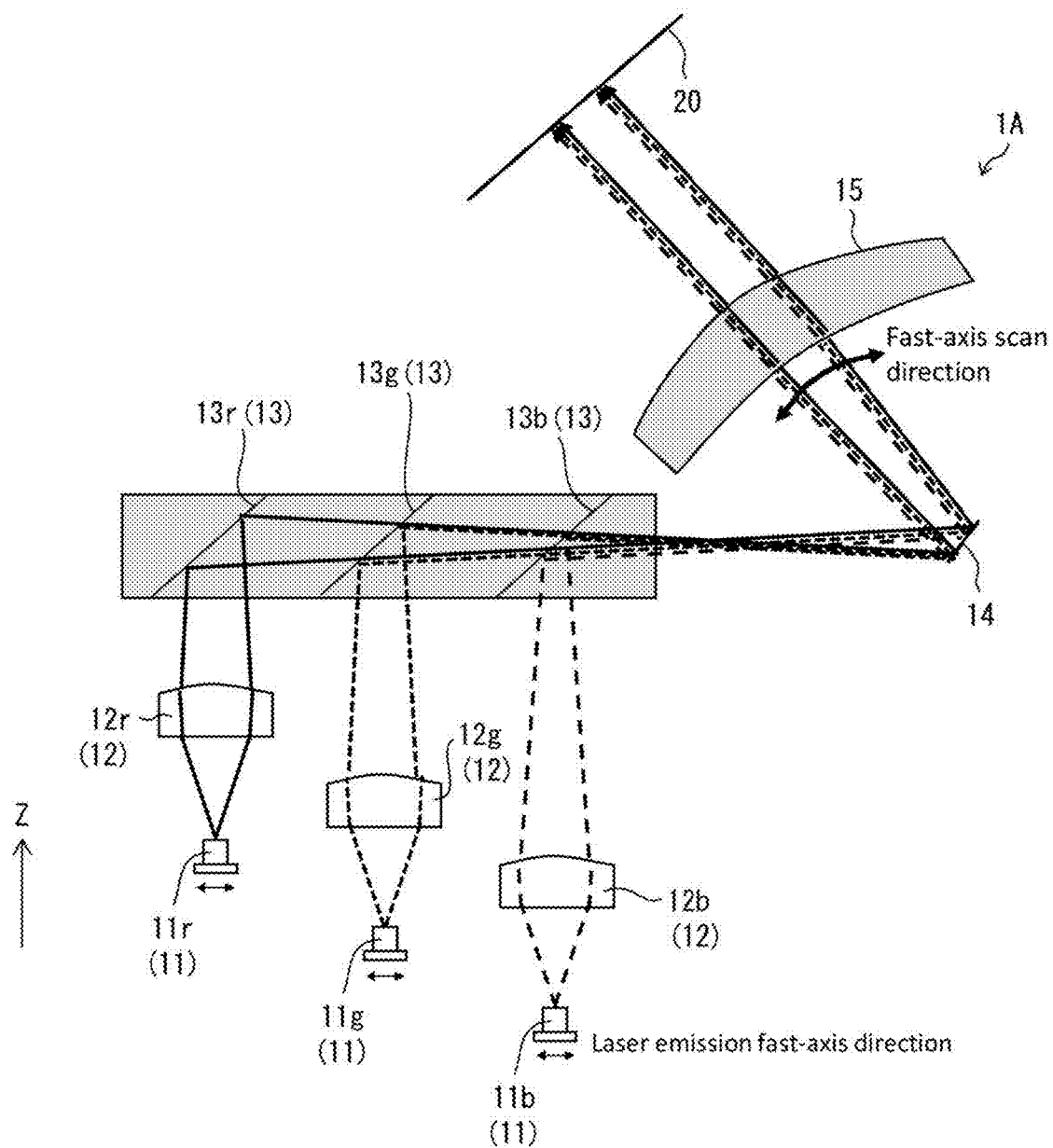

FIG. 11 is a schematic diagram illustrating an example configuration of a projection device in accordance with Embodiment 2.

Figure 12:
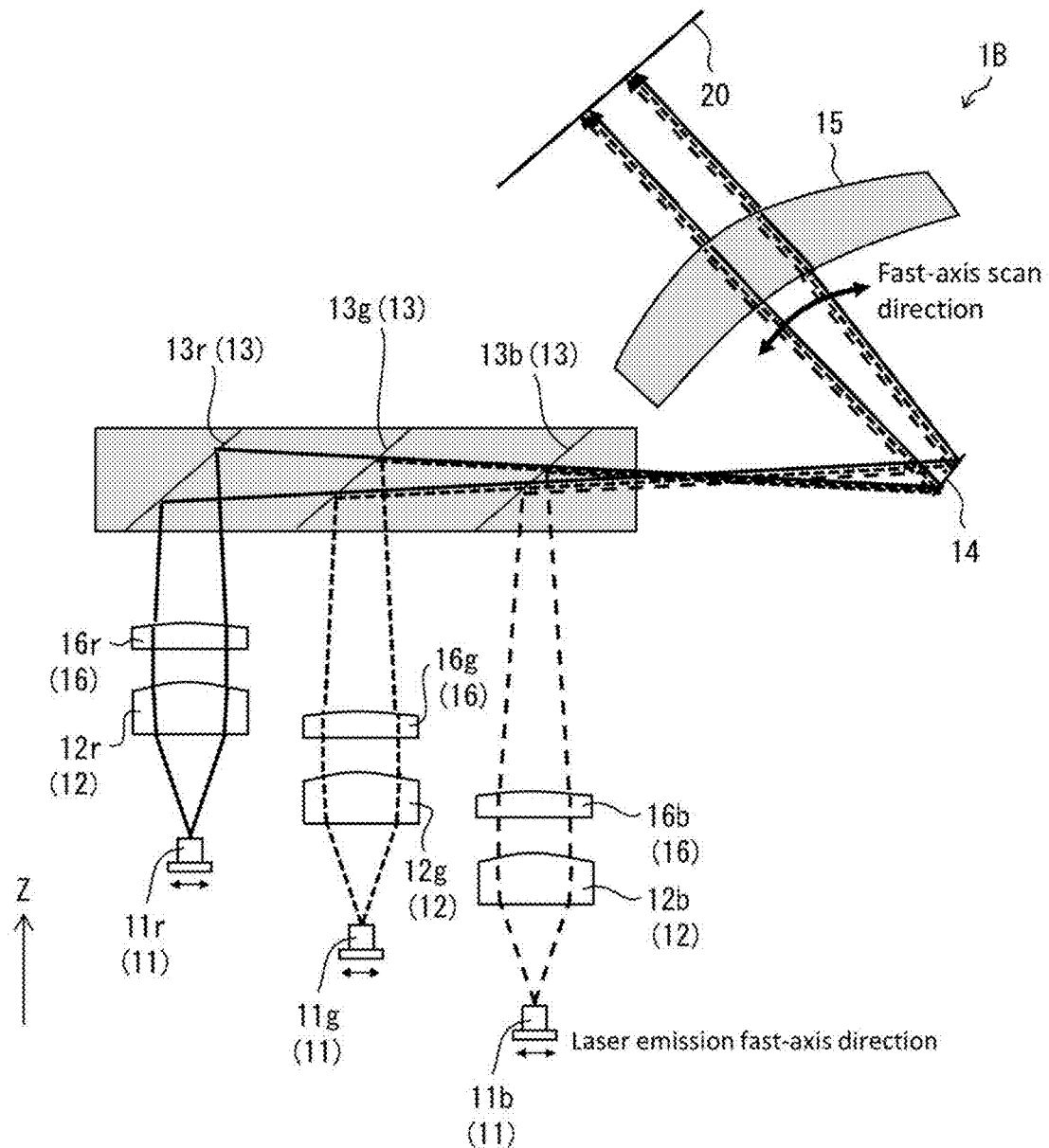

FIG. 12 is a schematic diagram illustrating an example configuration of a projection device in accordance with Embodiment 3.

Figure 13:
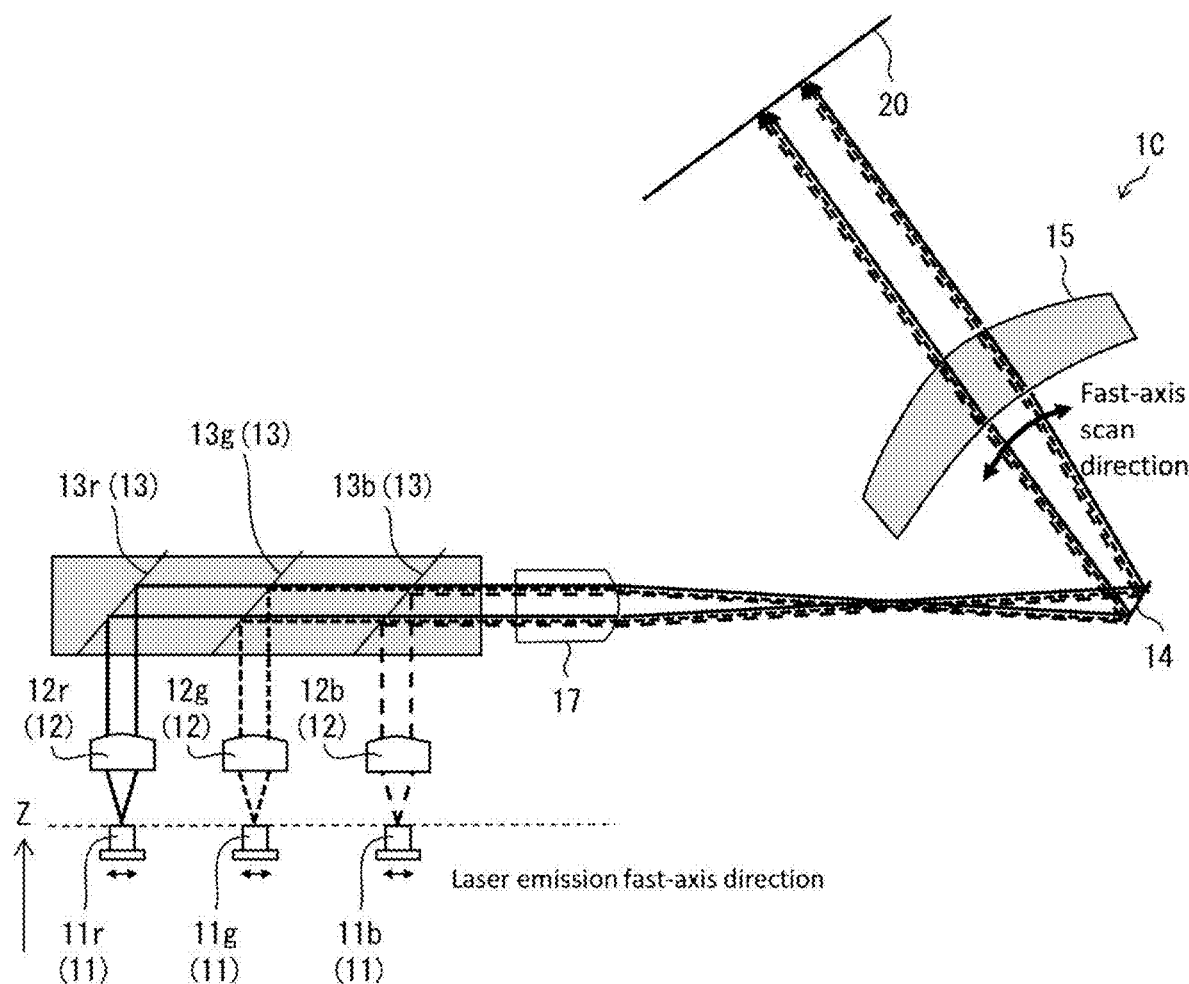

FIG. 13 is a schematic diagram illustrating an example configuration of a projection device in accordance with Embodiment 4.

DESCRIPTION OF EMBODIMENTS

Embodiment 1

Figure 1:
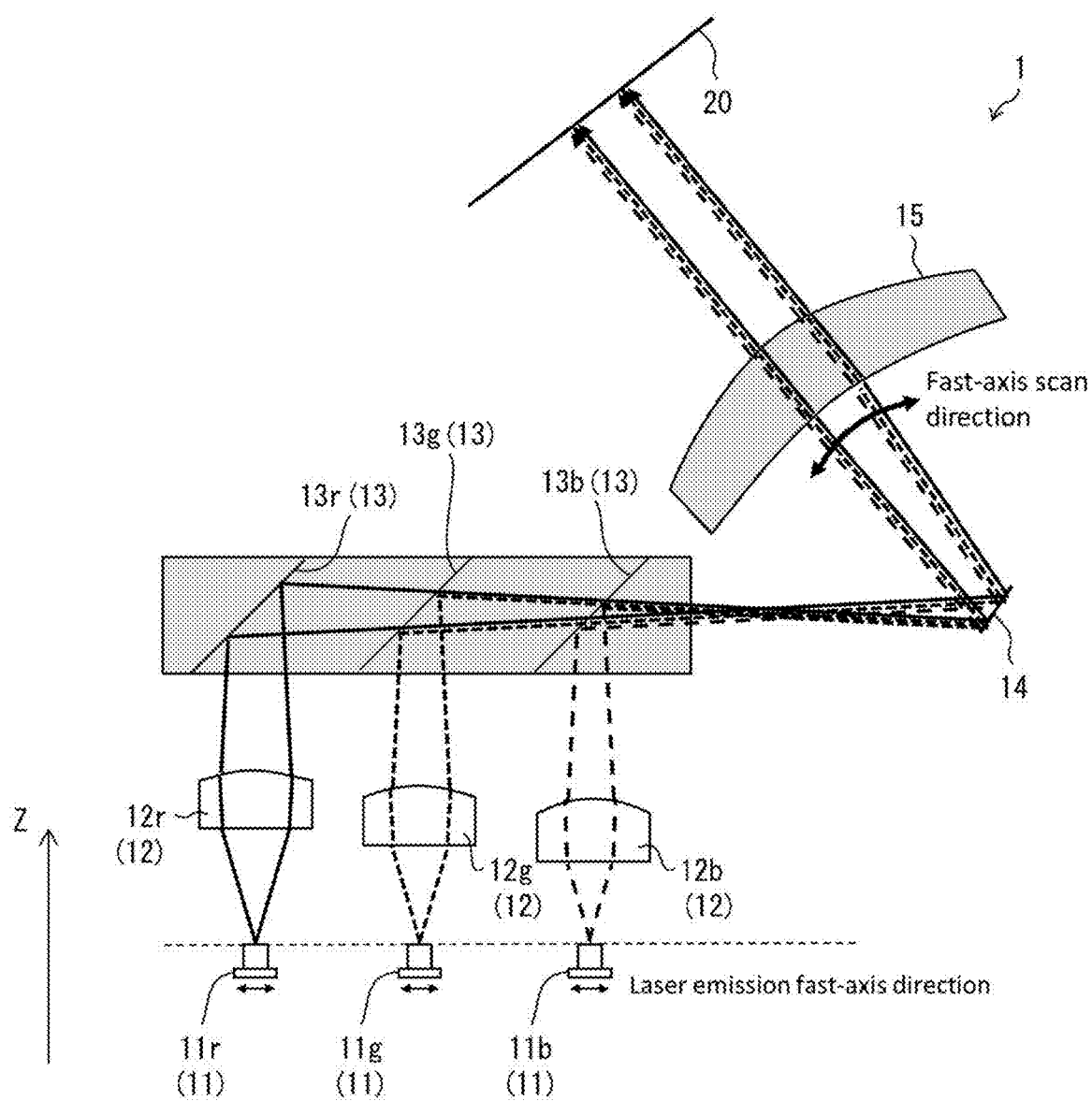
FIG. 1 is a schematic diagram illustrating an example configuration of a projection device in accordance with Embodiment 1.
Figure 2:
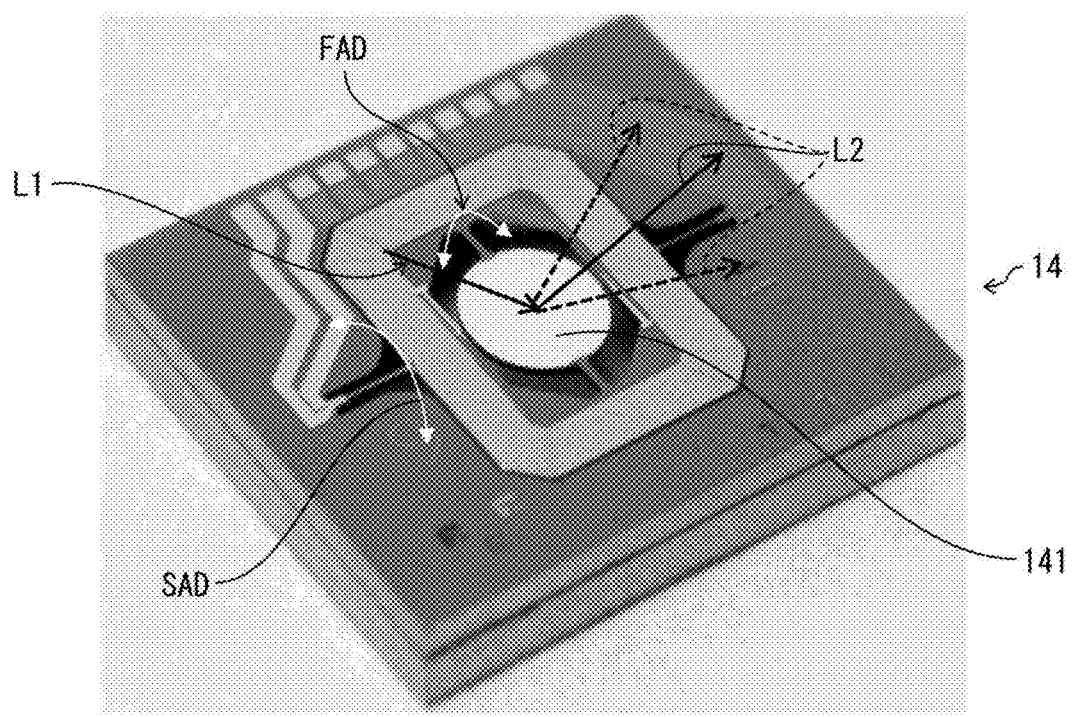
FIG. 2 is a perspective view schematically illustrating an example configuration of a MEMS mirror.
Figure 3:
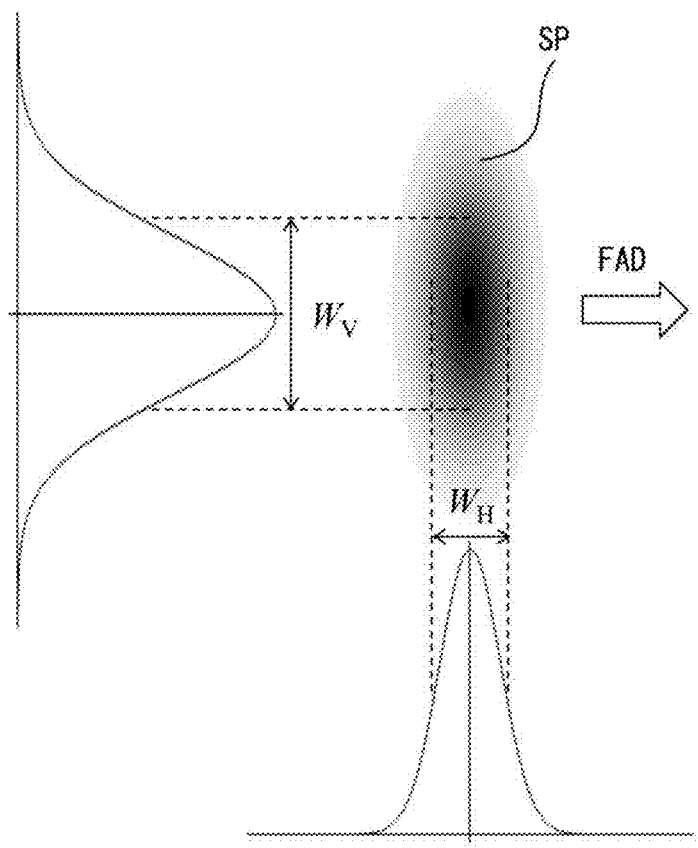
FIG. 3 is a diagram illustrating an example of (i) a shape of a projected spot of a laser beam on a screen and (ii) a power density distribution of the laser beam on the screen.

The following description will discuss an embodiment of the present invention, with reference to FIGS. 1 to 10. FIG. 1 is a schematic diagram illustrating an example configuration of a projection device 1 in accordance with Embodiment 1. FIG. 2 is a perspective view schematically illustrating an example configuration of a micro-electro-mechanical systems (MEMS) mirror 14 used in the projection device 1. FIG. 3 is a diagram illustrating an example of (i) a shape of a projected spot SP of a laser beam on a screen 20 and (ii) a power density distribution of the laser beam on the screen 20. In other words, FIG. 3 is a diagram illustrating a profile of the projected spot SP (instantaneous projected spot).

The projection device 1 is a laser beam scanning projection device (LBS projection device; hereinafter referred to simply as a "projection device") which scans (sweeps) a laser beam so as to project an image on the screen 20 (projection surface). As illustrated in FIG. 1, the projection device 1 includes light sources 11, lenses 12, dichroic mirrors 13, the MEMS mirror 14, a free-form lens 15, and the screen 20.

Each of the light sources 11 emits a laser beam. Each of the laser beams emitted from the light sources 11 has a shape (shape as seen in a cross section orthogonal to the direction of propagation) which is elliptical. In the present embodiment, the light sources 11 in the projection device 1 are plural in number. Specifically, the projection device 1 includes a red light source 11r which emits a red laser beam (red light), a green light source 11g which emits a green laser beam (green light), and a blue light source 11b which emits a blue laser beam (blue light). Note that the projection device 1 may include a light source other than these light sources. Furthermore, the number of light sources in the projection device 1 is not limited to three, and may alternatively be one, two, four, or more.

Each of the lenses 12 functions as a converging lens which focuses a respective one of the laser beams emitted by the light sources 11. Specifically, a laser beam received by one of the lenses 12 is outputted as weakly focused light (converging rays). Each of the lenses 12 is positioned so as to be able to receive a laser beam emitted from a respective one of the light sources 11. In the present embodiment, the lenses 12 are also plural in number and are provided such that each of the lenses 12 corresponds to a respective one of the light sources 11. Specifically, a first lens 12r is positioned so as to receive the red light, a second lens 12g is positioned so as to receive the green light, and a third lens 12b is positioned so as to receive the blue light.

The first lens 12r, the second lens 12g, and the third lens 12b may have differing focal distances so as to enable adjustment of relative sizes of laser beams of each of the red, green, and blue light, as seen after being combined by and outputted from the dichroic mirrors 13 (the size being that as seen in a cross section orthogonal to the direction of propagation). Each of the lenses 12 may have a function as a collimator lens which collimates a received laser beam. In such a case, z-axis-wise positioning of each of the light sources 11 relative to a corresponding one of the lenses 12, and vice versa, can be adjusted such that each of the laser beams outputted from the lenses 12 are focused.

Each of the dichroic mirrors 13 reflects a respective laser beam outputted from one of the lenses 12 so as to direct that laser beam toward the MEMS mirror 14. Each of the dichroic mirrors 13 is positioned so as to be able to receive a laser beam outputted from a respective one of the lenses 12.

A first dichroic mirror 13r is positioned so as to receive the red light outputted from the first lens 12r, and reflects the red light toward the MEMS mirror 14. A second dichroic mirror 13g is positioned so as to receive the green light outputted from the second lens 12g, and reflects the green light toward the MEMS mirror 14. The second dichroic mirror 13g transmits the red light reflected by the first dichroic mirror 13r. A third dichroic mirror 13b is positioned so as to receive the blue light outputted from the third lens 12b, and reflects the blue light toward the MEMS mirror 14. The third dichroic mirror 13b transmits the red light reflected by the first dichroic mirror 13r and the green light reflected by the second dichroic mirror 13g. In other words, the dichroic mirrors 13 combine the red, green, and blue light and direct the red, green, and blue light toward the MEMS mirror 14.

In this way, the dichroic mirrors 13 make it possible to combine the laser beams emitted from the light sources 11 such that the laser beams overlap spatially and propagate in the same direction toward the MEMS mirror 14. Use of the dichroic mirrors 13 also makes it possible to render the projection device 1 more compact.

The MEMS mirror 14 is a scanning section which reflects and two-dimensionally scans the laser beams emitted from the light sources 11 (in the present embodiment, a laser beam obtained by combining the red light, the green light, and the blue light). The projection device 1 projects (displays) an image on the screen 20 by controlling (i) off/off states of the light sources 11 and (ii) the timing of scanning carried out by the MEMS mirror 14. This control is achieved by a control circuit (e.g., a CPU; not illustrated).

The MEMS mirror 14 has two rotational axes. By being driven to rotate with respect to each rotational axis, the MEMS mirror 14 causes a received laser beam to be scanned on the screen 20. As illustrated in FIG. 2, the MEMS mirror 14 has a mirror part 141 which reflects a received laser beam (incident light L1). A direction from which the incident light L1 is incident on the mirror part 141 is fixed, but the direction in which the mirror part 141 reflects the laser beam (reflected light L2) is changed within a set range of scanning angles. This change is achieved by driving the mirror part 141 to rotate with respect to the two rotational axes. The mirror part 141 is (i) driven to rotate with respect to one of the rotational axes so as to move back and forth in a fast-axis scan direction FAD (primary scanning direction) and (ii) driven to rotate with respect to the other one of the rotational axes so as to move back and forth in a slow-axis scan direction SAD (secondary scanning direction). The fast-axis scan direction FAD corresponds to a horizontal direction of the screen 20, and the slow-axis scan direction SAD corresponds to a vertical direction of the screen 20.

Positioning of each of the lenses 12 relative to the MEMS mirror 14, and vice versa, is defined such that each laser beam outputted from the lenses 12 comes to a focus and then diverges before being incident on the MEMS mirror 14, as illustrated in FIG. 1. With this configuration, each laser beam which has been reflected by the MEMS mirror 14 is larger at the free-form lens 15 than at the MEMS mirror 14. In other words, the size of each laser beam is adjusted so that, as measured in a predetermined direction, the laser beam is larger when arriving at the free-form lens 15 than it is immediately after being reflected by the MEMS mirror 14. For example, the positioning of each of the lenses 12 relative to the MEMS mirror 14, and vice versa, is defined such that the size of the laser beam after being reflected by the MEMS mirror 14 is larger than the mirror part 141.

Note that the laser beam, after being reflected by the MEMS mirror 14, in general need only be enlarged in the horizontal direction. In other words, in general there is no need for the laser beam, after being reflected by the MEMS mirror 14, to be enlarged in the vertical direction. This is because the scan rate of the MEMS mirror 14 will often limit the achievable vertical resolution, the MEMS mirror 14 scan rate being set mostly by its size. For a typical MEMS mirror 14 used with a projection device, the size of the projected spot in the vertical direction is already approximately equal to a vertical direction pixel size defined by the scan rate (scan-rate limited vertical pixel size) without the need to expand the laser beam in this direction between the MEMS mirror 14 and the free-form lens 15.

Note that the scanning section need only be a member which two-dimensionally scans the laser beams, and is not limited to the MEMS mirror 14.

The free-form lens 15 functions as a shape altering section which changes focusing properties of the laser beam reflected by the MEMS mirror 14 and then outputs the laser beam toward the screen 20, such that when the laser beam is viewed as projected on the screen 20, a first width of the shape is shorter than a second width of the shape, the first width being along a horizontal direction (a first direction) corresponding to the fast-axis scan direction in which the MEMS mirror 14 scans the laser beam, the second width being along a vertical direction (a second direction orthogonal to the first direction). In other words, the free-form lens 15 changes the focusing properties of the laser beam reflected by the MEMS mirror 14 such that, after propagation of the laser beam to the screen 20, the shape of the laser beam when viewed on the screen 20 has a first width that is shorter than a second width of the shape. It can also be said that the free-form lens 15 changes the size and the shape of the laser beam reflected by the MEMS mirror 14, as viewed after the laser beam has propagated from the free-form lens 15 to the screen 20.

The free-form lens 15 has a focusing power at least in the horizontal direction. In the present embodiment, Embodiment 2, and Embodiment 4, the free-form lens 15 may have a focusing power not only in the horizontal direction, but also in the vertical direction. The free-form lens 15 has at least one free-form surface.

The free-form lens 15 produces on the screen 20 a projected spot which is narrower in the horizontal direction than would be in a case where a collimated laser beam reflected from the MEMS mirror 14 is outputted directly to the screen 20, without the free-form lens 15. Specifically, the free-form lens 15 produces on the screen 20 a projected spot SP having an elliptical shape such that a width of the shape in the horizontal direction (corresponding to the fast-axis scan direction FAD) is shorter than a width of the shape in the vertical direction, as illustrated in FIG. 3. As illustrated in FIG. 3, the horizontal direction width $W_H$ of the projected spot SP is defined by the full width half maximum (FWHM) of the power density distribution of the laser beam in the horizontal direction. Similarly, the vertical direction width $W_V$ of the projected spot SP is defined by the full width half maximum (FWHM) of the power density distribution of the laser beam in the vertical direction. Note, however, that the widths in the horizontal and vertical directions may be defined as a width other than the FWHM of the power density distribution.

In a configuration which does not include the free-form lens 15, in order to enable high efficiency of laser beam propagation, the projector is designed such that, for example, elliptical laser beams emitted from the light sources 11 are circularized before being incident on the MEMS mirror 14. However, with such a design, the laser beam which is incident on the screen 20 will have a circular shape. Such a configuration will therefore result in a lower image resolution as compared to a configuration in which the laser beam incident on the screen 20 has an elliptical shape. By including the free-form lens 15, the projection device 1 can output a laser beam which, at the screen 20, has an elliptical shape that is shorter in the horizontal direction than would otherwise be dictated by diffraction at the MEMS mirror 14. In this way, the projection device 1 makes it possible to improve image resolution compared to the projection device without a free-form lens 15 placed in the light path after the MEMS mirror 14. The reason for which changing the shape of the laser beam as above makes it possible to improve image resolution is described later.

The free-form lens 15 also functions as an image distortion correcting section which corrects distortion of the image. Specifically, the free-form lens 15 corrects so-called "smile" distortion, which occurs in the vertical direction of the image projected on the screen 20. In other words, the shape altering section is a free-form correction optic (FFCO) which also includes a function served by an image distortion correcting lens 150 included in a projection device 100 (comparative example) illustrated in FIG. 5. In other words, the projection device 1 makes it possible to simultaneously (i) correct distortion of an image and (ii) improve the resolution of the image on the screen 20 by changing the shape and size of a laser beam in the manner described above.

The free-form lens 15 can also be described as functioning to decrease an angle of divergence of the laser beam in the horizontal direction, which corresponds to the fast-axis scan direction in which the MEMS mirror 14 scans the laser beam. The positioning of the MEMS mirror 14 and the free-form lens 15 relative to each other may be defined in a manner so that this function is achieved.

[Basic Principles of Resolution Improvement]

The following description will discuss basic principles for improving image resolution. The MEMS mirror 14 is designed to be very small, so as to enable the MEMS mirror 14 to rapidly move back and forth in the fast-axis scan direction and the slow-axis scan direction. In general, a projection device is designed such that the size of the laser beam incident on the MEMS mirror 14 is smaller than the mirror part 141. In other words, the MEMS mirror 14 functions as a virtual aperture, and the characteristics, relative positioning, etc. of optics in the projection device are adjusted so that the entirety of the laser beam passes through this aperture.

In a typical configuration without the free-form lens 15 functioning as the shape altering section, to ensure high efficiency of laser beam propagation and maintain a relatively small projected spot, the laser beam is often circularized using, for example, a prism pair. In this case, the laser beam reflected by the MEMS mirror 14 is incident on the screen 20 after undergoing the effects of diffraction, without significant change of shape. In other words, the laser beam is incident on the screen 20 in a state as shown in (b) of FIG. 4 (described later). This causes a decrease in image resolution.

Figure 4:
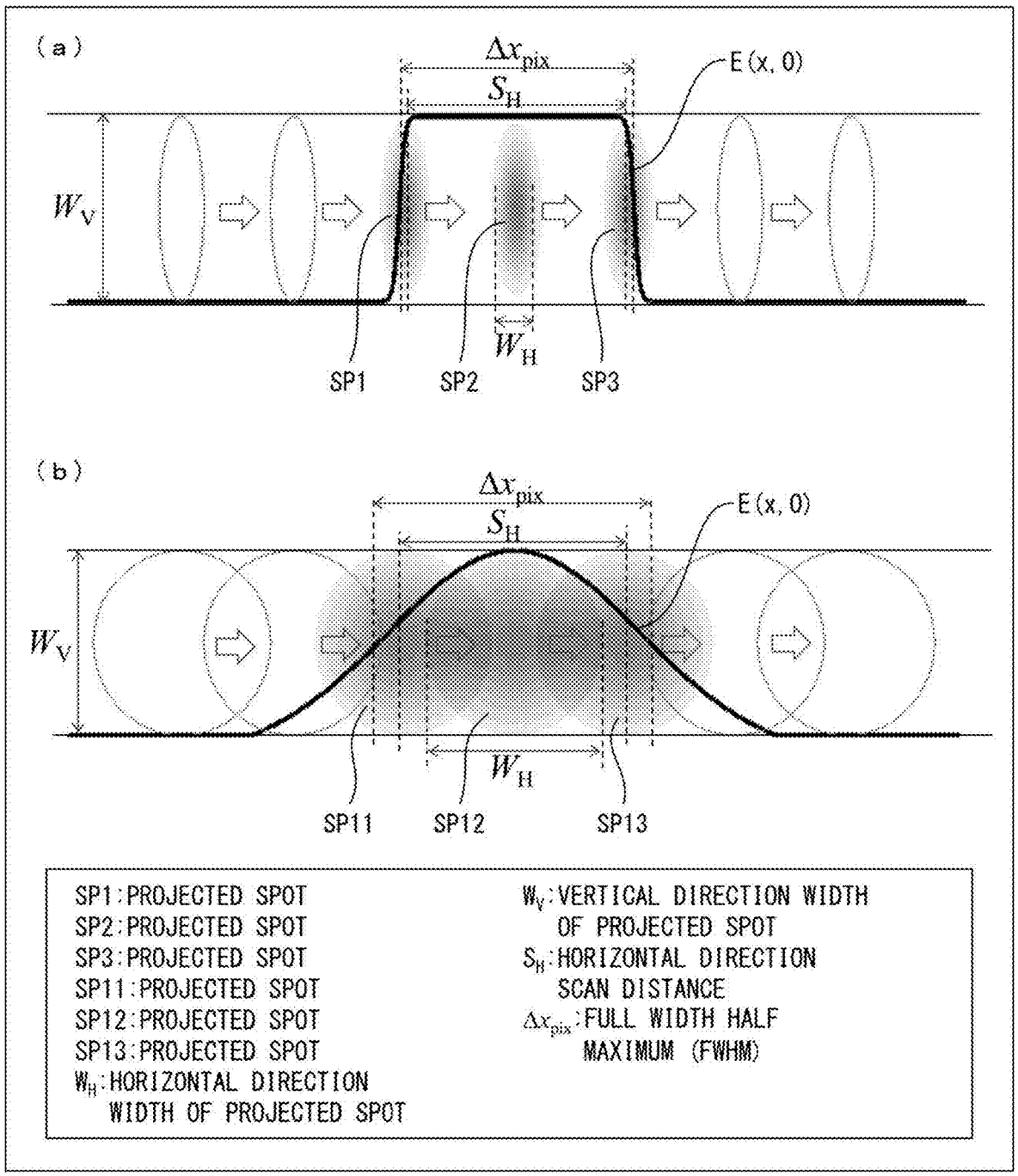
FIG. 4 is a diagram illustrating examples of laser beam transitions on a screen. (a) of FIG. 4 illustrates an example of a transition in the case of a laser beam whose projected spot is elliptical. (b) of FIG. 4 illustrates an example of a transition in the case of a laser beam whose projected spot is circular.

FIG. 4 is a diagram illustrating examples of laser beam transitions on the screen 20. (a) of FIG. 4 illustrates an example of a transition in the case of a laser beam whose projected spot is elliptical. (b) of FIG. 4 illustrates an example of a transition in the case of a laser beam whose projected spot is circular. In the example of FIG. 4, a single displayed pixel is in an "on" state, and pixels adjacent thereto are in an "off" state.

Here, the horizontal direction width and the vertical direction width of a projected spot are referred to as $W_H$ and $W_V$, respectively. In (a) of FIG. 4, a spot projected first in the "on" pixel is a projected spot SP1, a spot in a central portion of the "on" pixel is a projected spot SP2, and a spot projected last in the "on" pixel is a projected spot SP3. The same applies to the projected spots SP11, SP12, and SP13 in (b) of FIG. 4.

Image resolution in a vertical direction (maximum spatial resolution) is defined by the vertical direction width $W_V$ of the projected spot. Theoretically, the horizontal direction image resolution should be substantially equal to the vertical direction image resolution. However, the horizontal direction image resolution is defined not only by the horizontal direction width $W_H$ of the projected spot, but also by the scan velocity (sweep velocity) of the laser beam in the horizontal direction. As such, in a case where the projected spot is circular (or nearly circular) in shape, the horizontal direction image resolution will be substantially less than the vertical direction image resolution.

In a case where the image to be projected on the screen 20 has a target resolution of $N_H \times N_V$ pixels (for example, 1280×720 pixels) and a frame update rate is R (for example, 50 Hz), a horizontal direction scan time for a single pixel (average single pixel scan time) is $\tau_{pix}=1/(R \times N_H \times N_V)$ (for example, 22 ns). On the screen 20, during the average single pixel scan time $\tau_{pix}$, the center of the projected spot moves a horizontal direction scan distance $S_H$ (=average horizontal direction scan velocity $v_H \times$ average single pixel scan time $\tau_{pix}$). The average horizontal direction scan velocity $v_H$ must be defined such that the projected spot traverses across the horizontal direction image width $L_H$ in the time $N_H \times \tau_{pix}$. In other words, the horizontal direction width of one pixel is substantially equal to the horizontal direction scan distance $S_H$. Generally, the area for each pixel is approximately square in shape, so that average horizontal direction scan velocity $v_H \approx W_V/\tau_{pix}$, and $S_H \approx W_V$. Furthermore, a horizontal direction energy density distribution E(x,0) formed by a projected spot when one pixel is on (i.e., an energy density distribution during the average single pixel scan time $\tau_{pix}$) has a FWHM $\Delta x_{pix}$ that is defined by the horizontal direction scan distance $S_H$ and the horizontal direction width $W_H$ of the projected spot. This FWHM $\Delta x_{pix}$ defines the horizontal direction image resolution. However, the horizontal direction image resolution may be defined by a width other than the FWHM $\Delta x_{pix}$ of the horizontal direction energy density distribution E(x,0).

As illustrated in (a) of FIG. 4, in a case where the projected spots SP1, SP2, and SP3, which are elliptically shaped and have a horizontal direction width $W_H$ shorter than a vertical direction width $W_V$, are scanned across the screen 20, the energy density distribution E(x,0) will have a steep rise portion (corresponding to when the pixel is switched on) and a steep fall portion (corresponding to when the pixel is switched off). In other words, the shape of the energy density distribution E(x,0) corresponding to when a pixel is on will more closely resemble the shape of one pixel, and the FWHM $\Delta x_{pix}$ of the energy density distribution E(x,0) will be closer to the horizontal direction scan distance $S_H$ (i.e., the horizontal direction width of one pixel).

In contrast, as illustrated in (b) of FIG. 4, in a case where the projected spots SP11, SP12, and SP13, which are circularly shaped and have a horizontal direction width $W_H$ substantially equal to a vertical direction width $W_V$, are scanned across the screen 20, the energy density distribution E(x,0) will have a more gradual rise portion (corresponding to when the pixel is switched on) and a more gradual fall portion (corresponding to when the pixel is switched off). In other words, the shape of the energy density distribution E(x,0) corresponding to when a pixel is on is widened, and thus the FWHM $\Delta x_{pix}$ of the energy density distribution E(x,0) will be greater than that of (a) of FIG. 4. That is, the FWHM $\Delta x_{pix}$ will become larger than the horizontal direction scan distance $S_H$ (i.e., the horizontal direction width of one pixel).

Therefore, the shape of the projected spots SP1, SP2, and SP3 as illustrated in (a) of FIG. 4 is better suited for achieving the intended image resolution than the shape illustrated in (b) of FIG. 4. In other words, by projecting on the screen 20 the projected spots SP1, SP2, and SP3, which are shaped such that the horizontal direction width $W_H$ is shorter than the vertical direction width $W_V$, it is possible to improve image resolution.

COMPARATIVE EXAMPLE

Figure 5:
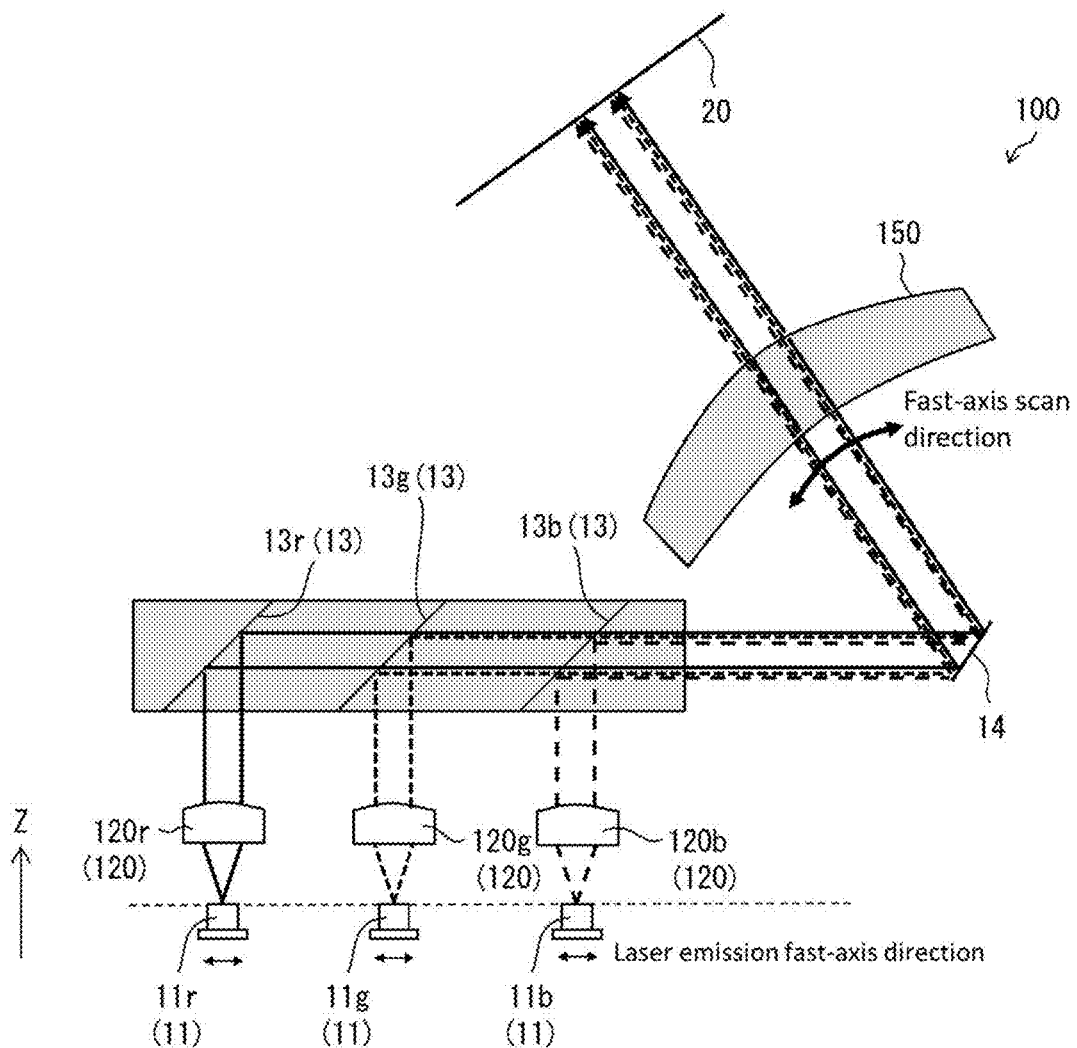
FIG. 5 is a schematic diagram illustrating an example configuration of a projection device in accordance with a comparative example.

Discussed next is a projection device 100, which is a comparative example with respect to the projection device 1. As illustrated in FIG. 5, the projection device 100 includes light sources 11, lenses 120, dichroic mirrors 13, a MEMS mirror 14, an image distortion correcting lens 150, and a screen 20. The projection device 100 differs from the projection device 1 in that (i) the projection device 100 includes the lenses 120 instead of the lenses 12 and (ii) the projection device 100 includes the image distortion correcting lens 150 instead of the free-form lens 15.

Each of the lenses 120 is a collimator lens which collimates a laser beam emitted from one of the light sources 11. Included as the lenses 120 are (i) a first lens 120r which receives and collimates red light, (ii) a second lens 120g which receives and collimates green light, and (iii) a third lens 120b which receives and collimates blue light.

The image distortion correcting lens 150 is an example of a free-form correction optic and corrects distortion of an image (specifically, "smile" distortion). In contrast to the free-form lens 15, the image distortion correcting lens 150 does not have a function of changing the shape of a laser beam such that a horizontal direction width of a projected spot is shorter than a vertical direction width of the projected spot, nor a function of changing the shape and size of the laser beam so as to decrease an angle of divergence.

The projection device 100 may be designed such that elliptical laser beams emitted from the light sources 11 are first circularized, using for example a prism pair, before being incident on the MEMS mirror 14. The lenses 120 of the projection device 100 collimate the laser beams before the laser beams are incident on the MEMS mirror 14. If the laser beams have been circularized before impinging on the MEMS mirror 14, the MEMS mirror 14 reflects circular laser beams toward the image distortion correcting lens 150. Because the image distortion correcting lens 150 does not have a function of decreasing the angle of divergence of the laser beams, the laser beams which have been reflected by the MEMS mirror 14 have a circular shape when incident on the screen 20. As such, the resultant energy density distribution E(x,0) is similar to that of (b) of FIG. 4, and image resolution is decreased.

If, on the other hand, the laser beams are not circularized before reaching the MEMS mirror 14, in order to achieve high efficiency of laser beam propagation in the projection device 100, the size of the laser beams reflected by the MEMS mirror 14 is necessarily reduced compared to the size of the MEMS mirror 14 in at least one direction. Since the image distortion correcting lens 150 does not significantly change focusing properties (beam size and shape) of the laser beams, the minimum projected spot size is ultimately set by diffraction of a laser beam with a size smaller than the size of the MEMS mirror 14 in at least one direction. The image resolution in at least one direction is therefore reduced compared to the circularized beam case.

In contrast, with the projection device 1, as described above, the positioning of each of the lenses 12 relative to the MEMS mirror 14, and vice versa, is adjusted so that laser beams are intentionally enlarged in the fast-axis scan direction so as to be larger at the free-form lens 15 than at the MEMS mirror 14. Furthermore, the free-form lens 15 outputs toward the screen 20 a laser beam whose angle of divergence has been decreased in the fast-axis scan direction. This makes it possible to (i) control the effects of diffraction that arise when projecting a laser beam having a very small beam diameter and (ii) project onto the screen 20 a laser beam which is narrower in the fast-axis scan direction than that of the projection device 100. As such, the projection device 1 produces an energy density distribution E(x,0) as illustrated in (a) of FIG. 4 and therefore makes it possible to prevent a decrease in image resolution.

Note that to reduce an increase in pixel width (FWHM $\Delta x_{pix}$) caused by scanning of the projected spot, it is possible to switch the pixel on and off in manner so that the average single pixel scan time $\tau_{pix}$ (on time) is shortened. Such a method is not preferable, however, as it will reduce display brightness. The projection device 1 of the present embodiment prevents such an increase in pixel width by employing the free-form lens 15 which shortens the horizontal direction width of the projected spot. As such, the projection device 1 improves image resolution while also preventing a decrease in display brightness.

(Simulation Results)

Figure 6:
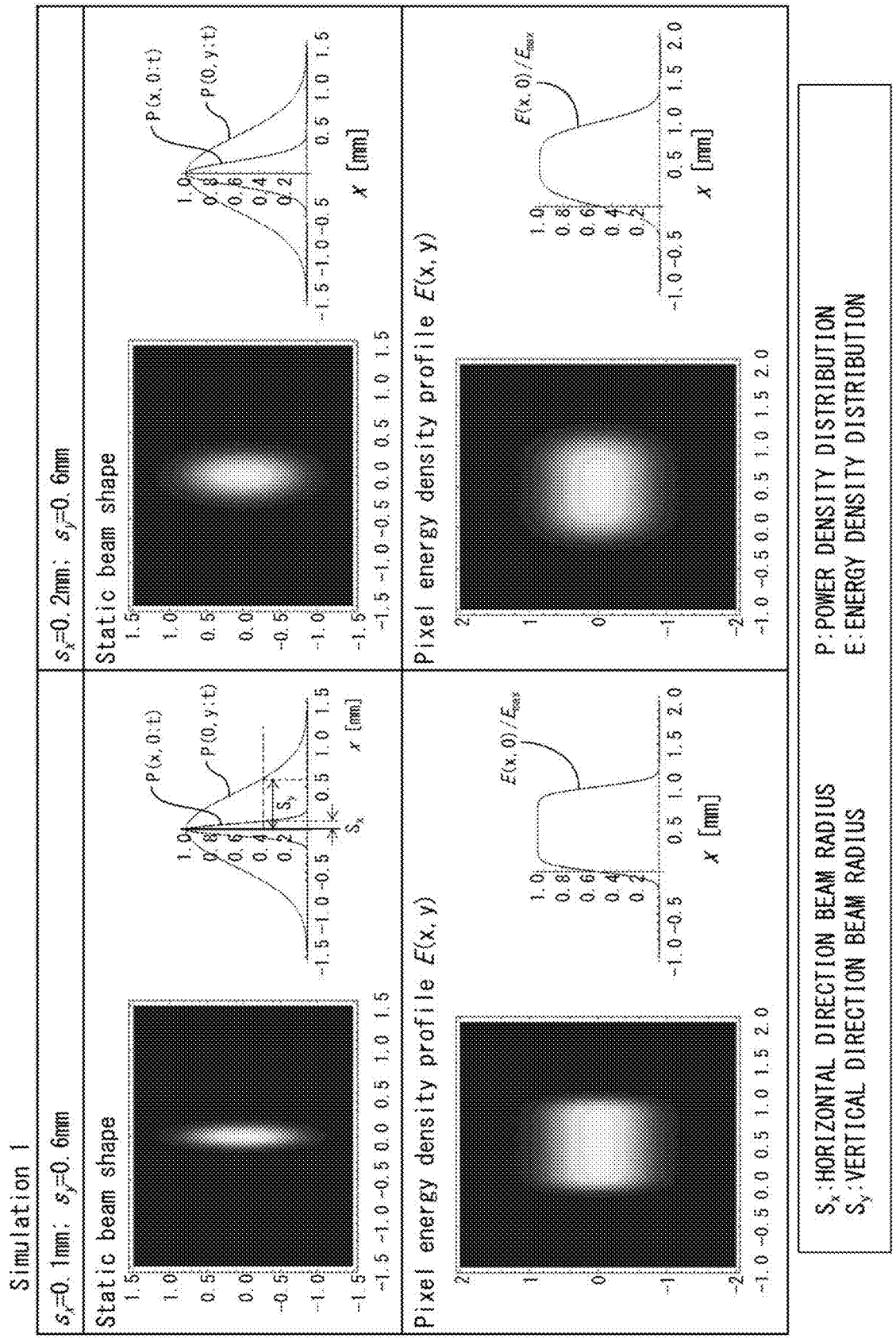
FIG. 6 illustrates examples of simulation results, grouped by projected spot shape, regarding the following: (i) projected spot shape, (ii) power density distribution, (iii) shape of area illuminated by laser beam during scanning equivalent to 1 pixel, and (iv) energy density distribution during scanning equivalent to 1 pixel.
Figure 7:
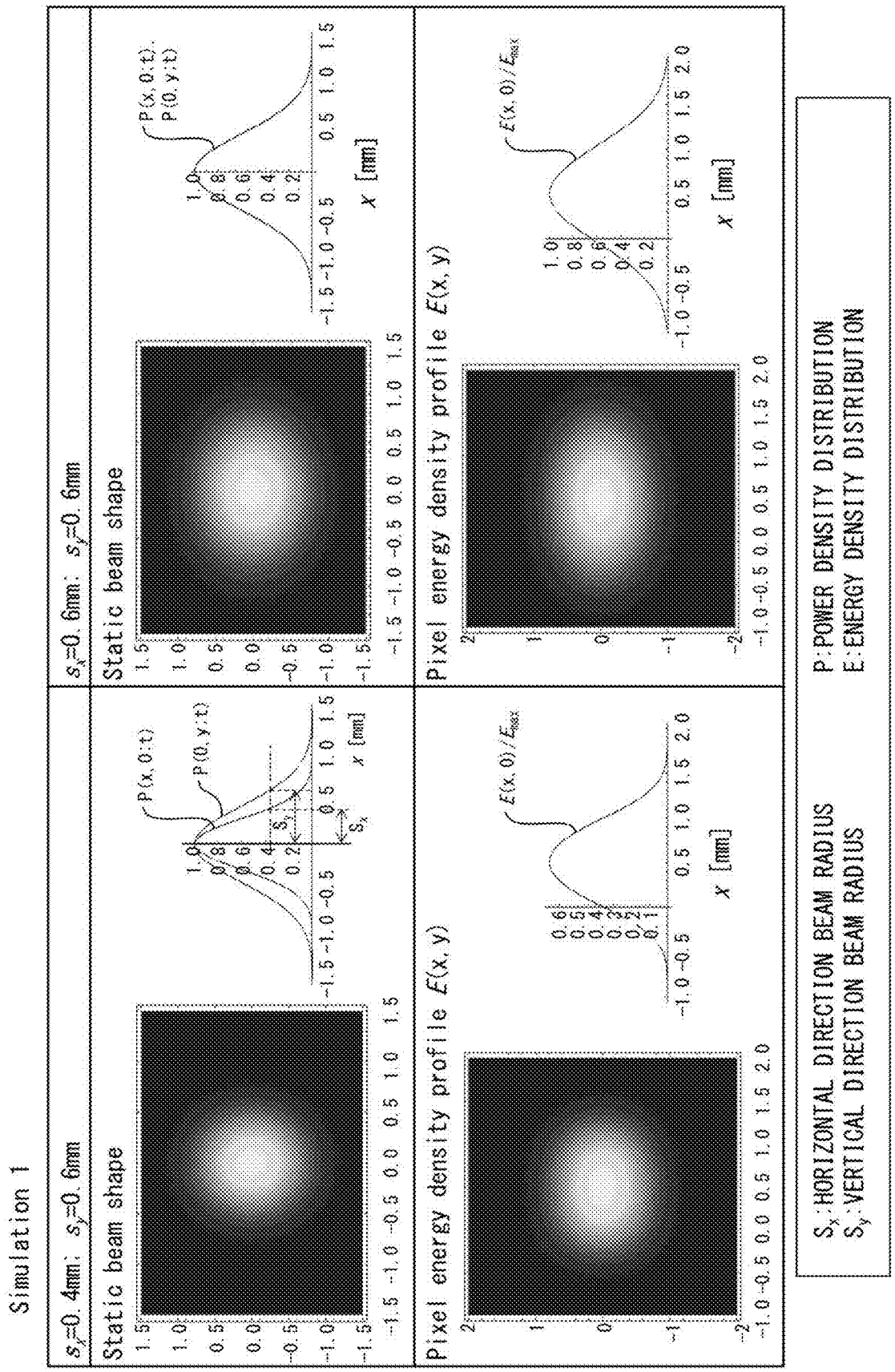
FIG. 7 illustrates examples of simulation results, grouped by projected spot shape, regarding the following: (i) projected spot shape, (ii) power density distribution, (iii) shape of area illuminated by laser beam during scanning equivalent to 1 pixel, and (iv) energy density distribution during scanning equivalent to 1 pixel.
Figure 8:
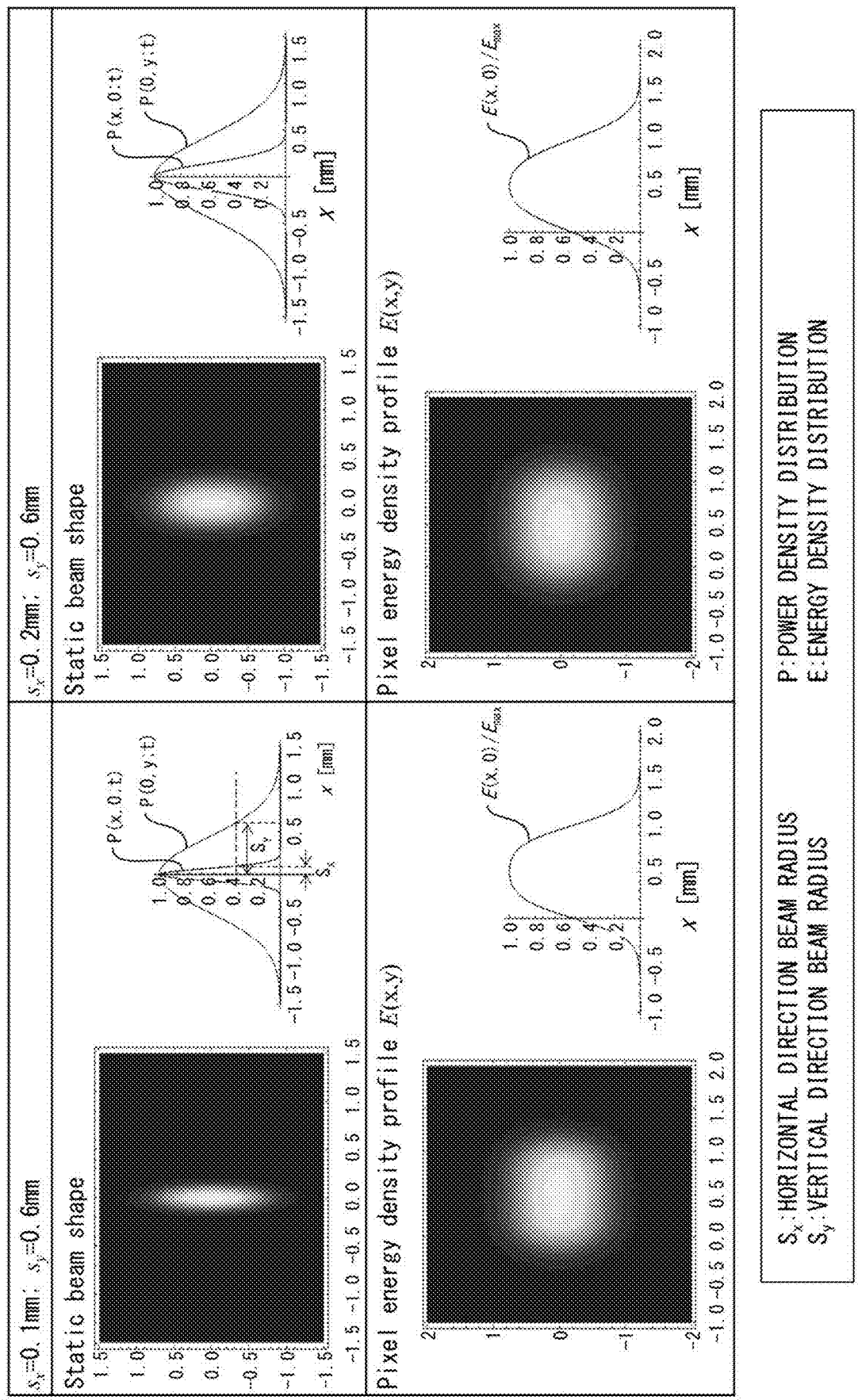
FIG. 8 illustrates other examples of simulation results, grouped by projected spot shape, regarding the following: (i) projected spot shape, (ii) power density distribution, (iii) shape of area illuminated by laser beam during scanning equivalent to 1 pixel, and (iv) energy density distribution during scanning equivalent to 1 pixel.
Figure 9:
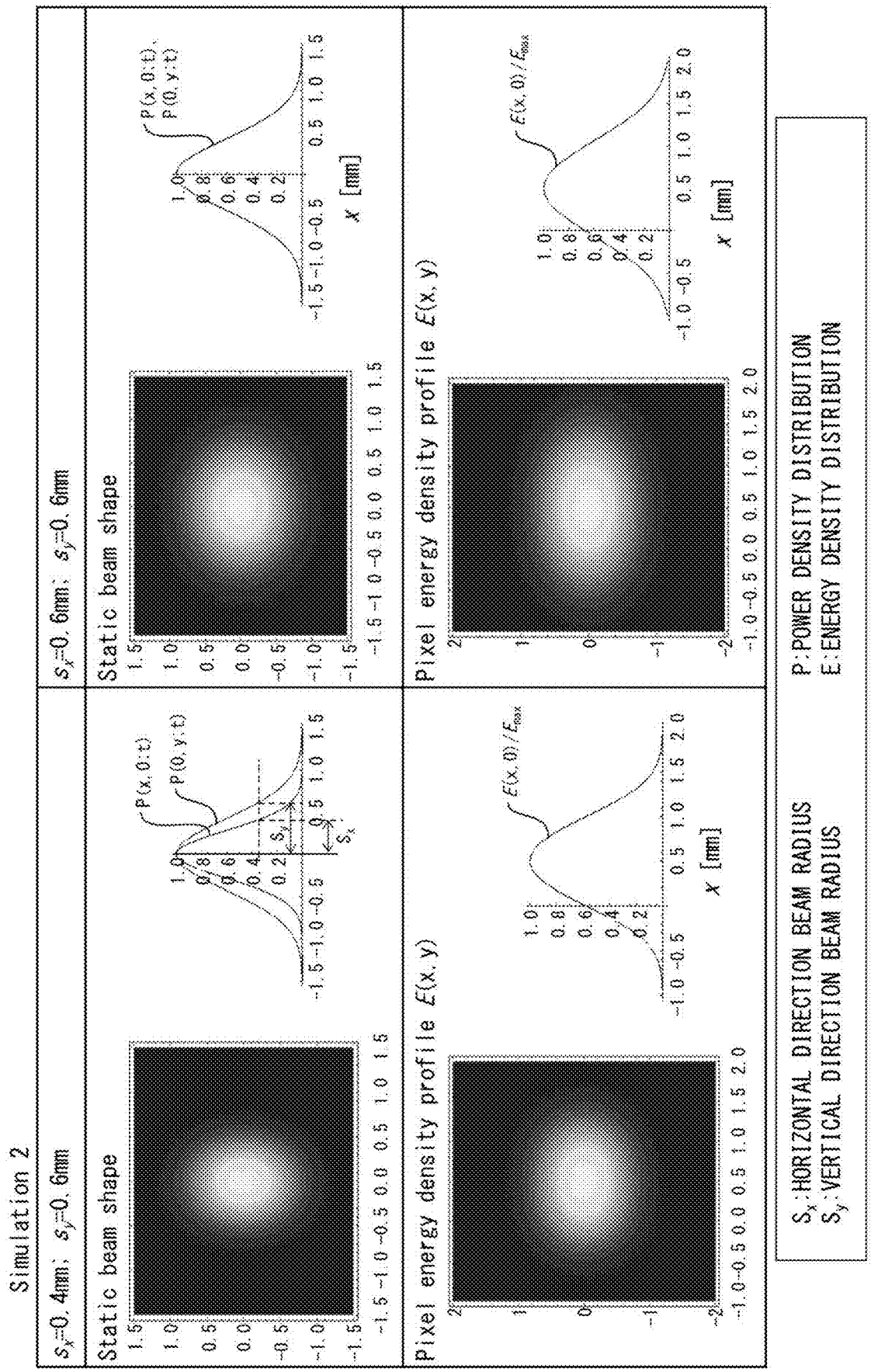
FIG. 9 illustrates other examples of simulation results, grouped by projected spot shape, regarding the following: (i) projected spot shape, (ii) power density distribution, (iii)

The following description will discuss an example of simulation results. FIGS. 6 and 7 each illustrate examples of simulation results, grouped by projected spot shape, regarding the following: (i) projected spot shape, (ii) power density distribution, (iii) shape of area illuminated by laser beam during scanning equivalent to 1 pixel, and (iv) energy density distribution (pixel energy density profile) during scanning equivalent to 1 pixel. FIGS. 8 and 9 each illustrate other examples of simulation results.

In the present simulations, $S_x$ represents a horizontal direction (x direction) beam radius, and $S_y$ represents a vertical direction (y direction) beam radius. The horizontal direction beam radius $S_x$ is represented by an x value where a normalized horizontal direction power density distribution P(x,0;t) of a laser beam (Gaussian beam) projected on the screen 20 is $1/e^2$ times its maximum value. The vertical direction beam radius $S_y$ is represented by a y value where a normalized vertical direction power density distribution P(0,y;t) is $1/e^2$ times its maximum value. In the present simulations, the vertical direction beam radius $S_y$ is kept constant at 0.6 mm, whereas the horizontal direction beam radius $S_x$ has been set variously to 0.1 mm, 0.2 mm, 0.4 mm, and 0.6 mm. In other words, these results are for simulations having differing ellipticity ($S_y/S_x$).

In the present simulations, the scan velocity v of the laser beam in the horizontal direction has been set to 1 mm/$\tau_{pulse}$ (scan velocity v is equal to the average horizontal direction scan velocity $v_H$; $\tau_{pulse}$ is equal to the time of one pulse (average single pixel scan time $\tau_{pix}$)). In other words, in the present simulations, in the horizontal direction, the laser beam moves 1 mm (horizontal direction scan distance $S_H$=1 mm) during the time of one pulse (i.e., during "on" time). Pulse rise time $\tau_{rise}$ and pulse fall time $\tau_{fall}$ have each been set to 0.01 $\tau_{pulse}$. The horizontal direction energy density distribution E(x,0) shown here is a normalized energy density distribution E(x,0)/$E_{max}$, which has been normalized using a maximum value $E_{max}$.

As illustrated in FIGS. 6 and 7, a smaller horizontal direction beam radius $S_x$ correlates to steeper rise and fall portions of the normalized horizontal direction energy density distribution E(x,0)/$E_{max}$. Furthermore, a smaller horizontal direction beam radius $S_x$ causes a shape of an area illuminated by the laser beam, during scanning equivalent to one pixel, to more closely resemble a substantially rectangular shape of one pixel. In this way, it can be understood that a smaller horizontal direction beam radius $S_x$ correlates to an improvement in image resolution.

In a case where $S_x$=0.2 mm, as in FIG. 6, the area illuminated by the laser beam takes on a shape which is, to a certain degree, similar to the shape of one pixel. Thus, it can be said that a decrease in image resolution is prevented in such a case. However, in a case where $S_x$=0.4 mm, as in FIG. 7, the area illuminated by the laser beam takes on a substantially elliptical shape whose long axis runs in the horizontal direction. Thus, it can be said that image resolution is decreased in such a case. The results of the simulations in FIGS. 6 and 7 illustrate that image resolution can be effectively improved in a case where the free-form lens 15 changes the shape of the laser beam such that in the projected spot, a ratio of a horizontal direction width to a vertical direction width is not more than 1/2 (i.e., $W_V/W_H \geq 2$).

FIGS. 8 and 9 illustrate the results of simulations in which pulse rise time $\tau_{rise}$ and pulse fall time $\tau_{fall}$ were each changed to 0.2 $\tau_{pulse}$. In the simulation results of FIGS. 8 and 9 as well, a smaller horizontal direction beam radius $S_x$ causes a shape of an area illuminated by the laser beam to more closely resemble the substantially rectangular shape of one pixel. In other words, it can be understood that a smaller horizontal direction beam radius $S_x$ correlates to an improvement in image resolution.

However, in the simulation results of FIGS. 6 and 7, the shape of the area illuminated by the laser beam more closely resembles the shape of one pixel than does that of the simulation results of FIGS. 8 and 9. In other words, a smaller horizontal direction beam radius $S_x$ and shorter pulse rise time $\tau_{rise}$ and pulse fall time $\tau_{fall}$ make it possible to cause the shape of the area illuminated by the laser beam to more closely the shape of one pixel (i.e., make it possible to improve image resolution).

FIG. 10 is a diagram for explaining a correlation between pulse rise time $\tau_{rise}$, horizontal direction beam radius $S_x$, and image resolution. (a) of FIG. 10 illustrates an example of the normalized horizontal direction energy density distribution $E(x,0)/E_{max}$. As illustrated in (a) of FIG. 10, a pulse fall width (pixel transition width) $\Delta x_{tr}$ is, in the normalized horizontal direction energy density distribution $E(x,0)/E_{max}$, a distance between (1) a value of x, at maximum value $E_{max} \times 90\%$ (indicated as $x_{90\%}$); and (2) a value of x, at maximum value $E_{max} \times 10\%$ (indicated as $x_{10\%}$). As can be seen from (a) of FIG. 10, a pulse rise width has the same value as the pulse fall width. In other words, the pulse rise width is also expressed as $\Delta x_{tr}$.

(b) of FIG. 10 is a diagram illustrating a correlation between (i) pulse rise time $\tau_{rise}$/pulse time $\tau_{pulse}$, (ii) the horizontal direction beam radius $S_x$, and (iii) the pulse rise width $\Delta x_{tr}$ of the normalized horizontal direction energy density distribution $E(x,0)/E_{max}$. As can be seen from (b) of FIG. 10, a smaller horizontal direction beam radius $S_x$ correlates to a smaller pulse rise width $\Delta x_{tr}$. Furthermore, a smaller pulse rise time $\tau_{rise}$ correlates to a smaller pulse rise width $\Delta x_{tr}$ (the same applies to the pulse fall time $\tau_{fall}$ and pulse fall width $\Delta x_{tr}$).

(c) of FIG. 10 is a diagram illustrating a correlation between (i) pulse rise time $\tau_{rise}$/pulse time $\tau_{pulse}$, (ii) the horizontal direction beam radius $S_x$, and (iii) the FWHM $\Delta x_{pix}$ of the normalized horizontal direction energy density distribution $E(x,0)/E_{max}$. As can be seen from (c) of FIG. 10, a smaller horizontal direction beam radius $S_x$ correlates to a smaller FWHM $\Delta x_{pix}$. Furthermore, a smaller pulse rise time $\tau_{rise}$ correlates to a smaller FWHM $\Delta x_{pix}$ (the same applies to the pulse fall time $\tau_{fall}$).

As described above, in the present simulations, because the horizontal direction scan distance $S_H$ is 1 mm, each pixel has a horizontal direction width of approximately 1 mm. As can be seen from (c) of FIG. 10, a smaller horizontal direction beam radius $S_x$ correlates to a FWHM $\Delta x_{pix}$ which is closer to approximately 1 mm, i.e., which is closer to the horizontal direction width of one pixel.

In this way, a smaller horizontal direction beam radius $S_x$ correlates to (i) steeper rise and fall portions in the normalized horizontal direction energy density distribution $E(x,0)/E_{max}$ and (ii) a FWHM $\Delta x_{pix}$ which is closer to the horizontal direction width of one pixel. As such, from the results in FIG. 10 as well, it can be seen that a smaller horizontal direction beam radius $S_x$ makes it possible to improve image resolution.

Embodiment 2

The following description will discuss another embodiment of the present invention. For convenience, members similar in function to those described in the foregoing embodiment(s) will be given the same reference signs, and their description will be omitted. FIG. 11 is a schematic diagram illustrating an example configuration of a projection device 1A in accordance with Embodiment 2.

As illustrated in FIG. 11, the projection device 1A has members which are similar to those of the projection device 1. However, in the projection device 1A, z-axis-wise positioning of (1) the red light source 11r and the first lens 12r relative to each other, (2) the green light source 11g and the second lens 12g relative to each other, and (3) the blue light source 11b and the third lens 12b relative to each other is defined such that the red light outputted from the first lens 12r, the green light outputted from the second lens 12g, and the blue light outputted from the third lens 12b each have a substantially equal size at the screen 20 after passing through the remaining optics of the projector 1A and propagating through free-space to the screen 20. This obviates the need to change the shape of the laser beams to account for size differences between the laser beams of each color, and thus makes it possible to improve image resolution efficiently. Furthermore, this configuration makes it possible to avoid deterioration in pixel color caused by size differences between the laser beams of each color.

Embodiment 3

The following description will discuss another embodiment of the present invention. For convenience, members similar in function to those described in the foregoing embodiment(s) will be given the same reference signs, and their description will be omitted. FIG. 12 is a schematic diagram illustrating an example configuration of a projection device 1B in accordance with Embodiment 3.

As illustrated in FIG. 12, the projection device 1B includes cylindrical lenses 16, in addition to the members of the projection device 1. Furthermore, in the present embodiment, each of lenses 12 functions as a collimator lens which collimates the laser beam emitted from a corresponding one of the light sources 11.

Each of the cylindrical lenses 16 functions as a converging lens which focuses the laser beam outputted from a corresponding one of the lenses 12 functioning as a collimator lens. Specifically, each of the cylindrical lenses 16 focuses the laser beam only in the horizontal direction.

In the present embodiment, the cylindrical lenses 16 are plural in number and are provided such that each of the cylindrical lenses 16 corresponds to a respective one of the lenses 12. Specifically, a first cylindrical lens 16r is positioned so as to receive collimated red light, a second cylindrical lens 16g is positioned so as to receive collimated green light, and a third cylindrical lens 16b is positioned so as to receive collimated blue light.

The combination of (i) the lenses 12 which function as collimator lenses and (ii) the cylindrical lenses 16 makes it possible to focus the laser beams in a manner similar to that achieved with the lenses 12 of Embodiment 1. The laser beams in the vertical direction may, however, be collimated (not converging or diverging) as they reflect on the MEMS mirror 14 and impinge upon the free-form lens 15. In this case, the free-form lens 15 of the present embodiment need only have appreciable lensing (focusing) power in the horizontal direction, which corresponds to the fast-axis scan direction (fast scan axis of the light sources 11). The laser beams emitted from the light sources 11 are not significantly modified in the vertical direction compared to the beam of a typical projection device design. In contrast, the projected spot sizes in the horizontal direction are reduced by the combined action of the cylindrical lenses 16 and the free-form lens 15. As such, in the projection device 1B, the image resolution is increased at least in the horizontal direction.

Embodiment 4

The following description will discuss another embodiment of the present invention. For convenience, members similar in function to those described in the foregoing embodiment(s) will be given the same reference signs, and their description will be omitted. FIG. 13 is a schematic diagram illustrating an example configuration of a projection device 1C in accordance with Embodiment 4.

As illustrated in FIG. 13, the projection device 1C includes a field lens 17, in addition to the members of the projection device 1. Furthermore, in the present embodiment, each of lenses 12 functions as a collimator lens which collimates a laser beam, similarly to the lenses 12 of Embodiment 3.

The field lens 17 is provided between the dichroic mirrors 13 and the MEMS mirror 14. The field lens 17 functions as a converging lens which weakly focuses laser beams. Similarly to Embodiment 3, the combination of (i) the lenses 12 which function as collimator lenses and (ii) the field lens 17 makes it possible to focus the laser beams in a manner similar to that achieved with the lenses 12 of Embodiment 1. As such, in a case where the field lens 17 has a function of focusing the laser beams only in the horizontal direction (as with the cylindrical lenses 16), the above configuration makes it possible, similarly to Embodiment 3, to enable the projection device 1C to achieve image resolution similar to that of a typical projection device in the vertical direction whilst attaining a decreased projected spot size and associated resolution enhancement in the horizontal direction.

Note that, more usually, the field lens 17 focuses in both the horizontal and vertical direction so that the optical properties of the projection device 1C of the present embodiment are similar to those of the projection device 1 of Embodiment 1.

[Recap]

A projection device in accordance with Aspect 1 of the present invention is a projection device which scans a laser beam so as to project an image, the projection device including: a light source which emits the laser beam; a scanning section which reflects and two-dimensionally scans the laser beam emitted from the light source; and a shape altering section which changes focusing properties of the laser beam reflected by the scanning section such that, after propagation of the laser beam to a projection surface onto which the image is to be projected, a shape of the laser beam when viewed on the projection surface has a first width that is shorter than a second width of the shape, the first width being along a first direction corresponding to a primary scanning direction in which the scanning section scans the laser beam, the second width being along a second direction orthogonal to the first direction.

In Aspect 2 of the present invention, the projection device according to Aspect 1 may be configured such that the shape altering section changes the focusing properties of the laser beam such that a ratio of the first width to the second width is not more than 1/2.

In Aspect 3 of the present invention, the projection device according to Aspect 1 or 2 may be configured such that a size of the laser beam is greater at the shape altering section than at the scanning section.

In Aspect 4 of the present invention, the projection device according to any one of Aspects 1 to 3 may be configured such that the shape altering section is a free-form lens.

In Aspect 5 of the present invention, the projection device according to Aspect 3 may be configured such that: the projection device further includes a converging lens which focuses the laser beam emitted from the light source; and positioning of the converging lens and the scanning section relative to each other is defined such that, before being incident on the scanning section, the laser beam outputted from the converging lens comes to a focus and then diverges, so that the size of the laser beam is greater at the shape altering section than at the scanning section.

In Aspect 6 of the present invention, the projection device according to Aspect 5 may be configured such that the converging lens focuses the laser beam only in the first direction.

In Aspect 7 of the present invention, the projection device according to Aspect 6 may be configured such that the converging lens is a cylindrical lens.

In Aspect 8 of the present invention, the projection device according to any one of Aspects 5 to 7 may be configured so as to further include: a collimator lens which collimates the laser beam emitted from the light source, the converging lens being provided so as to focus the laser beam after the laser beam has been outputted from the collimator lens.

In Aspect 9 of the present invention, the projection device according to any one of Aspects 1 to 8 may be configured such that the shape altering section corrects distortion of the image.

A projection device in accordance with Aspect 10 of the present invention is a projection device which scans a laser beam so as to project an image, the projection device including: a light source which emits the laser beam; a scanning section which reflects and two-dimensionally scans the laser beam emitted from the light source; and a shape altering section which changes a shape and a size of the laser beam reflected by the scanning section as viewed after the laser beam has propagated from the shape altering section to a projection surface upon which the projected image is to be viewed, the size of the laser beam being greater at the shape altering section than at the scanning section, the shape altering section being configured to decrease an angle of divergence of the laser beam in a first direction corresponding to a primary scanning direction in which the scanning section scans the laser beam.

[Supplemental Remarks]

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST 1, 1A, 1B, 1C Projection device
11 Light source
11r Red light source (light source)
11g Green light source (light source)
11b Blue light source (light source)
12 Lens (converging lens, collimator lens)
12r First lens (converging lens, collimator lens)
12g Second lens (converging lens, collimator lens)
12b Third lens (converging lens, collimator lens)
14 MEMS mirror (scanning section)
15 Free-form lens (shape altering section)
16 Cylindrical lens (converging lens)
17 Field lens (converging lens)
20 Screen (projection surface)

The invention claimed is:

1. A projection device which scans a laser beam so as to project an image, the projection device comprising:
   a light source which emits the laser beam;
   a scanning section which reflects and two-dimensionally scans the laser beam emitted from the light source; and
   a shape altering section which changes focusing properties of the laser beam reflected by the scanning section such that, after propagation of the laser beam to a projection surface onto which the image is to be projected, a shape of the laser beam when viewed on the projection surface has a first width that is shorter than a second width of the shape, the first width being along a first direction corresponding to a primary scanning direction in which the scanning section scans the laser beam, the second width being along a second direction orthogonal to the first direction;

wherein the shape altering section changes the focusing properties of the laser beam such that a ratio of the first width to the second width is not more than 1/2.

2. The projection device according to claim 1, wherein a size of the laser beam is greater at the shape altering section than at the scanning section.

3. The projection device according to claim 1, wherein the shape altering section is a free-form lens.

4. The projection device according to claim 2, further comprising: a converging lens which focuses the laser beam emitted from the light source, wherein positioning of the converging lens and the scanning section relative to each other is defined such that, before being incident on the scanning section, the laser beam outputted from the converging lens comes to a focus and then diverges, so that the size of the laser beam is greater at the shape altering section than at the scanning section.

5. The projection device according to claim 4, wherein the converging lens focuses the laser beam only in the first direction.

6. The projection device according to claim 5, wherein the converging lens is a cylindrical lens.

7. The projection device according to claim 4, further comprising: a collimator lens which collimates the laser beam emitted from the light source, the converging lens being provided so as to focus the laser beam after the laser beam has been outputted from the collimator lens.

8. The projection device according to claim 1, wherein the shape altering section corrects distortion of the image.

9. A projection device which scans a laser beam so as to project an image, the projection device comprising:

a light source which emits the laser beam;

a scanning section which reflects and two-dimensionally scans the laser beam emitted from the light source; and a shape altering section which changes a shape and a size of the laser beam reflected by the scanning section as viewed after the laser beam has propagated from the shape altering section to a projection surface upon which the projected image is to be viewed, the size of the laser beam being greater at the shape altering section than at the scanning section, the shape altering section being configured to decrease an angle of divergence of the laser beam in a first direction corresponding to a primary scanning direction in which the scanning section scans the laser beam;

wherein the shape altering section decreases the angle of divergence of the laser beam in the first direction such that a ratio of a first width to a second width is not more than 1/2, the first width being the width, along the first direction, of the shape of the laser beam when viewed on the projection surface, the second width being the width, along a second direction orthogonal to the first direction, of the shape of the laser beam when viewed on the projection surface.

* * * * *